Patented Feb. 11, 1941

2,231,455

UNITED STATES PATENT OFFICE 2,231,455

COLORED TITANIUM PIGMENTS

Holger H. Schaumann, Roselle, and Robert K. Whitten, Edgewood Hills, Del., and Robert W. Ball, Avondale, Pa., assignors to E. I. du Pont de Nemours & Company, Wilmington, Del., a corporation of Delaware No Drawing. Application December 6, 1938, Serial No. 244,174

8 Claims. (Cl. 134—58)

This invention relates to the art of titanium oxide pigments. More particularly it relates to a process for controlling the tint of colored titanium oxide pigments. Still more particularly it relates to a process for producing gray titanium dioxide pigments of predetermined and improved shade and subordinate tint.

U. S. Patent 2,062,137 discloses a process by which gray titanium dioxide pigments may be produced by calcining, at a temperature of at least 800° C., an intimate mixture of a compound of titanium dioxide or hydrated titanium dioxide, with a compound of vanadium. The gray titanium dioxide pigments thereby produced are definitely superior to prior art mixtures of white pigments and colored pigments such as carbon black and the like, formerly employed in gray paints. For instance, the employment of said gray titanium dioxide pigments in outside paints such as oil type paints, orthodox and alkyd resin enamels, pyroxylin lacquers, and the like, applied to wood, metal, etc., exposed to the elements, results in films which chalk definitely less than do those comprising the aforementioned prior art pigment mixtures. Furthermore, when the hereinbefore described gray titanium dioxide pigment comprising films do chalk on excessive exposure, the chalk is colored and the objectionable whitening effects noted when paints containing mixtures of white and colored pigments are employed, is not evident. However, the employment of said gray titanium dioxide pigments has been greatly limited on account of the variable yellow subordinate tints of said gray pigments. In the paint industry, as in the rubber, linoleum, paper, textile, and related industries, blue-white and blue-gray tints are associated with quality. This is undoubtedly due to the fact that for the most part the materials employed in this industry, such as oil vehicles, caoutchouc, cellulose fiber, and the like, must be subjected to extensive refining operations, such as bleaching, and the like, in order to eliminate or reduce their natural yellow color; moreover, paint films and the like comprising naturally occurring materials turn yellow on aging and the extent of this yellowing is greater the poorer the quality of said naturally occurring materials. While light gray titanium dioxide pigments, obtained by the process of U. S. Patent 2,062,137 by calcining mixtures comprising precipitated titanium dioxide and a solubilized vanadium compound in an amount corresponding to about 0.3% elemental vanadium on the basis of the titanium dioxide weight, are usually only slightly yellow in tint, dark gray titanium dioxide pigments obtained by this process by increasing the vanadium addition to about 1%, ordinarily have a very pronounced yellow undertone. Thus, in many instances said gray pigments are not suitable for use in the aforementioned paint, rubber, linoleum, paper, textile, and related industries, where blue-white and blue gray tints are demanded. Furthermore, said gray pigments of the prior art varied in subordinate yellow tint even when made under identical conditions.

It is an object of this invention to control the subordinate tints in gray titanium pigments. A further object is to produce neutral gray titanium pigments. A still further object is to produce gray titanium dioxide pigments having a yellow undertone. A still further object is to produce gray titanium dioxide pigments having a desirable blue undertone. A still further object is to produce dark gray titanium dioxide pigments, i. e. to produce gray titanium dioxide pigments of decreased reflectivity, or value as defined by the Munsell color scale. Additional objects will become apparent from an examination of the following description and claims.

These objects and advantages are accomplished by the following invention which broadly comprises calcining an intimate mixture of a titanium pigment, a vanadium compound, and an alkali metal salt, said calcination being conducted for at least part of the calcination period in a carbon monoxide comprising atmosphere.

In a more restricted sense this invention comprises taking an intimate mixture comprising a titanium pigment, between about 0.1% and about 2%, calculated as elemental vanadium and based upon the weight of the titanium pigment, of a vanadium salt, and between about 0.3% and about 3%, calculated as alkali metal and based upon the weight of the titanium dioxide of an alkali metal salt, and calcining said mixture in the presence of carbon monoxide at a temperature between about 800° C. and about 1050° C. Thereafter, the pigment is cooled to a temperature below about 600° C.

The preferred embodiment of this invention comprises taking an aqueous suspension of a titanium dioxide pigment comprising about 300 grams titanium dioxide per liter, which pigment is substantially free from color imparting impurities, and adding thereto between about 0.25% and about 1.5%, calculated as vanadium and based upon the weight of the titanium dioxide, of vanadyl chloride and between about 0.5% and about 3%, calculated as potassium and based upon the weight of the titanium dioxide, of potassium carbonate. A precipitated titanium dioxide pigment such as that produced according to the process disclosed in U. S. Patent 1,851,487 or Reissue Patent 18,854 is the preferred pigment for use in my herein described process. The titanium dioxide slurry so treated with the vanadium and potassium compounds is dewatered, as by filtering, to provide a pigment cake comprising about 50% water. This pigment cake is calcined at a temperature between about 850° C. and about 1050° C. for a period of time between about 15 minutes and about 5 hours in an atmosphere comprising from about 0.1% to about 2% carbon monoxide. Thereafter, the pigment is cooled to a temperature below about 600° C., preferably below about 400° C. If a gray titanium dioxide pigment having a yellow undertone should be desired, said cooling is effected in air during an interval of time between about one hour and about five hours. If a neutral gray titanium dioxide pigment is desired, said cooling is effected in air during an interval of time between about 5 minutes and about 1 hour. If a gray titanium dioxide pigment having a blue undertone is desired, said cooling is effected in an atmosphere comprising more than about 0.1% carbon monoxide, or is effected rapidly in an oxygen comprising atmosphere substantially free from carbon monoxide. Preferably, said cooling is effected in air during an interval of time between about 2 seconds and about 5 minutes. If a gray titanium pigment having a very blue tint is desired, the cooling in air should be effected during an interval of time not exceeding about 10 seconds.

The following examples are given for illustrative purposes and are not intended to place any restrictions or limitations on the herein described invention.

In these examples the titanium dioxide employed was the filtered, washed precipitate obtained by hydrolysis of a titanium sulfate solution. Dry potassium carbonate and an aqueous solution of a vanadium salt were added to said precipitate to provide a thick pigment slurry which was then stirred adequately to insure complete dispersion of the vanadium salt and the dissolved potassium carbonate throughout the mass of the titanium dioxide slurry. The resultant treated pulp was dried to a water content of about 30% and the moist pigment cake so formed was calcined as hereinbelow described.

*Example I*

A moist pigment cake prepared in the aforementioned manner and comprising 250 lbs. $TiO_2$, 0.365% vanadium added as vanadyl sulfate, and 0.863% $K_2CO_3$, on the basis of the $TiO_2$ weight, was charged into an internally fired rotating batch calciner. The calciner was fired with light fuel oil and the flame was controlled to maintain a substantial carbon monoxide content in the atmosphere over the charge throughout the course of the calcination period. The temperature of said charge was raised to 900° C. during a period of 75 minutes. An analysis of the gases in the calciner at the end of 20 minutes of this calcination period showed that said gases comprised 0.2% CO, 14.5% $CO_2$, and 1.1% $O_2$. At the end of 70 minutes of the calcination period, said gases comprised 0.6% CO, 13.6% $CO_2$ and 1.4% $O_2$. At the end of the 75 minutes calcination period a sample of the resultant calcined pigment was immediately removed from the calciner and dropped through air onto a cold steel plate, whereupon the temperature of said calcined pigment sample was reduced to less than 400° C. in a period of less than 5 seconds. The pigment chilled in this manner was of a pleasing blue-gray color.

The remainder of the charge was allowed to remain in the calciner exposed to atmospheric air, which was substantially carbon monoxide free, for a period of 90 minutes during which time its temperature decreased from 900° C. to 800° C. A second sample was then removed and chilled by dropping it through air onto a cold steel plate in the same manner as the first. A comparison of the two samples showed that the second was definitely lighter in depth of shade, i. e., it had a higher value as defined by the Munsell color scale, and also was definitely yellow in tint.

Since it was desired to produce a neutral gray from this particular calcination, the charge was reheated to 900° C., employing a carbon monoxide comprising atmosphere as used in the first heating, and on completion of the calcination the pigment was dischargd, dropping a distance of 3 feet through air into a steel tray. The discharged pigment was cooled to 400° C. in about 10 minutes after completion of the calcination. Color comparisons showed that the cooled pigment so obtained was a neutral gray of the desired depth of shade.

In addition to showing how the subordinate blue or yellow tint in gray titanium dioxide pigments can be modified by controlling the length of time the hot pigment is allowed to remain in contact with carbon monoxide free air, the above example also illustrates that the subordinate tint of calcined pigment can be corrected to the desired undertone by reheating in a carbon monoxide comprising atmosphere and properly controlling the rate of cooling under oxidizing conditions. In other words, if it is desired to convert a calcined gray titanium dioxide pigment with a yellow undertone to a gray pigment with a blue undertone, the pigment is heated to calcination temperature in a carbon monoxide comprising atmosphere, preferably above about 850° C. but not above about 1050° C., and cooled quickly. Conversely, if it is desired to produce a gray pigment with a yellow undertone from a calcined gray pigment having a blue undertone, the pigment can be heated in a carbon monoxide comprising atmosphere, preferably above about 850° C. but not above about 1050° C., and allowed to cool slowly down to about 600° C. and preferably down to about 400° C. in an oxidizing atmosphere, the degree of yellow tint being controlled by the length of time the pigment at a temperature in excess of from about 600° C. to about 400° is exposed to the oxidizing atmosphere. Furthermore, if it is desired to produce a gray pigment with a very definite yellow tint from a gray pigment with a blue tint, the reheating may be carried out in a carbon monoxide free oxygen comprising atmosphere and the pigment cooled slowly in air to a temperature of from about 600° C. to about 400° C.

*Example II*

A moist pigment cake was prepared in the same manner as that employed in Example I, said cake comprising 100 parts by weight of $TiO_2$, 0.254 part by weight vanadium added as vanadyl sulfate, and 0.692 part by weight $K_2CO_3$. Portions of the aforementioned pigment cake were calcined in an externally electrically heated rotating calciner in contact with carbon monoxide comprising and carbon monoxide free atmospheres. The carbon monoxide free atmospheres were obtained by calcination in the presence of atmospheric air, while the carbon monoxide comprising atmospheres were obtained by incomplete combustion of illuminating gas over the charge. The illuminating gas comprised 14.9% carbon monoxide, 5.1% carbon dioxide, 30.3% saturated hydrocarbons, 26.7% hydrogen, 18.8% nitrogen, and 0.6% oxygen. Said illuminating gas was burned under such conditions that it provided an atmosphere comprising from about 0.05% carbon monoxide to about 15% carbon monoxide.

A portion of the aforementioned pigment cake was calcined to 900° C., as hereinbefore described, in an atmosphere comprising 1.5% carbon monoxide and was then cooled to 400° C. in a period of 8 seconds. A gray titanium dioxide pigment having a definitely pleasing blue undertone was thereby produced. Another portion, calcined in a similar manner but allowed to remain in contact with atmospheric air for 5 minutes while cooling down from 900° C. to 650° C., and then cooled in 8 seconds time from 650° C. to 400° C., produced a gray pigment which was substantially neutral in tint, i. e., it had neither a blue nor a yellow undertone. Another portion calcined in a similar manner, but with the time of cooling from 900° C. to 650° C. increased to 10 minutes, followed by cooling to 450° C. in 55 minutes, produced a gray pigment with a yellow undertone. The gray titanium dioxide pigment of yellow subordinate tint was lighter in depth of shade, i. e., it had a higher value as defined by the Munsell color scale, than did the novel blue-gray titanium dioxide pigment.

By increasing the ratio of vanadium to $TiO_2$ from 0.254 to 0.51 part by weight vanadium per 100 parts $TiO_2$, and repeating the hereinabove described three calcinations, an increase in depth of shade for each set of calcination and cooling conditions, with substantially the same effects on subordinate blue or yellow tint, was obtained. Again, the pigment with yellow undertone was considerably lighter in depth of gray than the blue-gray pigment.

*Example III*

A moist pigment cake prepared in substantially the same manner as that employed in Example I and comprising approximately 2000 pounds $TiO_2$ and 0.365% vanadium, added as vanadyl chloride prepared by dissolving air dried vanadium pentoxide in concentrated hydrochloric acid, and 0.863% $K_2CO_3$, on the basis of the $TiO_2$ weight, was charged into an internally fired rotating batch calciner. The calciner was fired with light fuel oil, and the flame was controlled to maintain 0.25% carbon monoxide content in the atmosphere over the charge throughout the course of the calcination period. The temperature of said charge was raised to 910° C. during a period of 3 hours. At the end of the 3 hour calcination period the flame was extinguished and air was blown into the calciner for 5 minutes, during which time the pigment cooled to 850° C. The pigment was then discharged into a buggy equipped with water cooled pipes whereupon said pigment was cooled to 400° C. in a period of 7 seconds after discharge from the calciner. The resultant product was a gray pigment with a very slight blue undertone.

Three consecutive calcinations, under the hereinbefore described conditions, produced gray titanium dioxide pigments substantially equal in depth of shade and blue undertone to the above pigment.

*Example IV*

A moist pigment cake prepared in substantially the same manner as that employed in Example III and comprising 2000 lbs. $TiO_2$, 0.785% vanadium added as vanadyl chloride, and 1.87% $K_2CO_3$, on the basis of the $TiO_2$ weight, was charged into an internally fired rotating batch calciner. The calciner was fired with light fuel oil and the flame was controlled so as to maintain a 0.25% carbon monoxide content in the atmosphere over the charge during the final hour of the calcination period. The temperature of said charge was raised to 950° C. during a period of 4 hours. At the end of the 4 hour calcination period the flame was extinguished and air was blown into the calciner for 2 minutes, during which time the pigment cooled down to 920° C. The pigment was then discharged from the calciner and cooled to 400° C. within 5 minutes after said discharge. The resultant pigment was dark gray in color and substantially neutral in tint.

Three consecutive calcinations, made under the hereinbefore described conditions, produced pigments substantially equal in depth of shade and tint to the above pigment.

It is to be understood that the hereinbefore disclosed specific embodiments of our invention may be subject to variation and modification without departing from the scope of this invention. For instance, while we prefer to employ in our calcination operation precipitated titanium dioxide such as that obtained by hydrolysis of titanium sulfate solutions according to the process of U. S. Patent 1,851,487 or Reissue Patent 18,854, it is to be understood that we may employ titanium dioxide precipitated by other processes well-known in the art, or we may employ calcined titanium dioxide. In any case, however, it is to be understood that the titanium dioxide employed should be substantially free from color imparting impurities such as iron, chromium, and the like.

While we prefer to use vanadyl chloride it is to be understood that solutions of other salts of vanadium may be employed such as vanadyl sulfate, etc. Furthermore, the advantages of this invention are also obtained when vanadium compounds other than those of the water soluble type are employed such as vanadium pentoxide, vanadium tetraoxide, and the like.

The optimum amount of vanadium compound associated with the titanium dioxide during our novel calcination operation can best be learned by experimental trial and will vary with the type and previous history of the titanium dioxide employed, the proportion of alkali metal salt to vanadium, the calcination and cooling conditions, and the use requirements of the finished pigment. Other conditions being equal, the value, as defined by the Munsell color scale, of the gray titanium dioxide pigment produced decreases as the proportion of vanadium to titanium dioxide is increased.

While we prefer to use between about 0.1% and about 2%, and for most ordinary purposes between about 0.2% and about 1%, calculated as elemental vanadium and based upon the weight of the $TiO_2$ it is to be understood that the herein described process may be employed using amounts outside of this preferred range. Thus, appreciable effects are obtained when one uses as little as about 0.05% and as much as 5% or more, calculated as elemental vanadium and based upon the weight of the $TiO_2$.

As is well-known in the art, and as is more particularly disclosed, for example, in U. S. Patent 1,892,693, the pigment properties of white calcined titanium dioxide pigments are markedly improved by incorporating predetermined and usually minor amounts of an alkali metal compound in the precipitated titanium dioxide prior to the calcination operation. We have determined that the pigment properties of the novel gray titanium dioxide pigments of our invention are also improved markedly by the employment of said alkali metal salts. Moreover, we have discovered that the depth of the blue subordinate tint of the gray pigments of our invention is affected to a considerable extent by the ratio of alkali metal salt to vanadium employed in said process. We have discovered that other conditions being equal, increasing the ratio of alkali metal salt to vanadium produces blue-gray titanium dioxide pigments of increased blue tint. For instance, a precipitated titanium dioxide/potassium carbonate/vanadyl sulfate mixture comprising 3.46 parts $K_2CO_3$, and 0.254 part vanadium per 100 parts by weight $TiO_2$ when calcined to 950° C. and cooled to 400° C. in 9 seconds after completion of said calcination, produced a gray pigment with a very blue subordinate tint, while a pigment prepared with the same ratio of vanadium to $TiO_2$ but with the $K_2CO_3$ content decreased to 0.863 part $K_2CO_3$ per 100 parts $TiO_2$ and calcined and cooled in exactly the same manner had only a slight blue subordinate tint.

While potassium carbonate is the preferred salt it is to be understood that other potassium salts as well as other alkali metal salts or admixtures of such salts may be employed in our process without departing from the scope thereof.

The optimum amount of alkali metal salt associated in any instance with the vanadium treated titanium dioxide during our novel calcination operation can best be learned by experimental trial and will depend on the type and previous history of the titanium dioxide employed, the amount of vanadium salt, the calcination and cooling conditions, and the use requirements of the finished pigment. Appreciable effects are obtained when one employs as little as about 0.3 per cent alkali metal salt, calculated as alkali metal on the basis of the $TiO_2$ weight. Increased effects are obtained when as much as about 3 per cent or more alkali metal salt, calculated as alkali metal on the basis of the $TiO_2$ weight, is employed. It is preferred, however, that while the amount of alkali metal salt employed, calculated as alkali metal on the basis of the $TiO_2$, should be in the range of from about 0.3 to about 3 per cent, the ratio of alkali metal to vanadium, should also be in the range or from about 0.1 to about 10 parts alkali metal to 1 part by weight vanadium.

The incorporation of the vanadium and alkali metal compounds with the titanium oxide can be effected in various ways. On account of the superior results obtained thereby, we prefer to add said compounds to an aqueous suspension of the precipitated titanium dioxide and thereafter to dewater said treated suspension prior to calcination of the same. However, since a certain amount of the expensive vanadium compound is lost during this dewatering operation we may prefer, on account of economic considerations, to incorporate the vanadium and potassium compounds directly into the dewatered pigment cake. We can also add the vanadium salts to a solution of a titanium salt, such as the sulfate or chloride, and then heat to effect hydrolysis. We can also add an insoluble vanadium compound to a titanium solution from which the titanium is subsequently precipitated or we can add said insoluble vanadium compound directly to a precipitated titanium compound, intimately mix the two, and then calcine the mixture.

Calcination may be effected in any of the types of calcining equipment well-known in the art, such as batch and continuous rotary calciners, and the like. Said calciners may be heated internally as with oil or gas flames or they may be heated externally, for example, electrically. However, when said calciners are heated externally arrangements must be made in our invention to introduce carbon monoxide gas over the charge in said calciners.

In practicing our invention it is desirable that the mixture of titanium dioxide, vanadium, and alkali metal salts should be calcined to a temperature of not less than about 800° C., and preferably to a temperature in the range of from about 850° C. to about 1050° C. Furthermore, said mixture should preferably be held at a temperature in the range of from about 850° C. to about 1050° C. for a period of not less than about 15 minutes, and not more than about 5 hours.

It is to be understood that careful control of the carbon monoxide content of the gases in contact with the pigment during at least the latter portion of the calcination operation is an essential feature of our invention. Appreciable effects are obtained when said gases while in contact with the hot pigment comprise as little as about 0.05% carbon monoxide. Increased effects are obtained when said gases comprise higher amounts of carbon monoxide, such as about 15% carbon monoxide. Further increase in the carbon monoxide content of said gases results in no increase in the blue tint of the resultant pigment, and, in fact, is undesirable on account of the health hazard presented. For most ordinary purposes we prefer to employ an atmosphere comprising from about 0.1% to about 2% carbon monoxide. We have found it desirable to subject the pigment to the aforementioned carbon monoxide comprising gases during at least the last 20% of the calcination operation and preferably the last 50% of said calcination operation.

We have determined that gray pigments having a maximum blue tint are had when the pigment calcined in a carbon monoxide comprising atmosphere is cooled to a temperature of less than about 600° C. and preferably to a temperature of less than about 400° C. in an atmosphere comprising more than about 0.05% carbon monoxide and preferably more than about 0.1% carbon monoxide. However we have also discovered that gray pigments having a maximum blue tint may be obtained when the pigment calcined in a carbon monoxide atmosphere is cooled to a temerature of less than about 600° C. and preferably to a temperature of less than about 400° C. in an oxygen comprising atmosphere, e. g. air, providing said cooling is effected rapidly enough. On account of the ease of operation presented, we prefer to effect said cooling in air, as by discharging the calcined pigment onto a water cooled surface. The optimum length of time in which the novel product of our invention is cooled in an oxygen comprising carbon monoxide free atmosphere, e. g. air, from the calcination temperature to a temperature in the range of from about 600° C.

to about 400° C. can best be learned by experimental trial, and will depend largely on the use requirements of the finished pigment. As hereinabove stated, bluest tints are obtained when said cooling in air is effected during a period of not more than about 10 seconds. However, gray titanium dioxide pigments having a blue undertone are obtained when said cooling in air, or other oxygen comprising carbon monoxide free atmosphere, is effected during a period of not more than about 5 minutes. On the other hand, neutral gray titanium dioxide pigments are obtained when said cooling is effected in a period of from about 5 minutes to about 1 hour; whereas, gray pigments of predetermined yellow undertone may be had by effecting said cooling during a period of an hour or more.

While our invention has been described with particular reference to titanium dioxide pigments comprising substantially pure titanium dioxide, it is to be understood that it is applicable to all types of titanium oxygen compound pigment materials and admixtures of said materials with extenders, such as barium sulfate, calcium sulfate, lithopone, magnesium silicate, and the like. Examples of titanium oxygen compounds contemplated in this invention include, in addition to titanium dioxide, such pigment materials as calcium titanate, barium titanate, zinc titanate, and the like.

From our study of the factors involved in controlling subordinate tints and depth of shade of gray titanium dioxide pigments, we believe the effects observed by varying calcination and cooling conditions can be explained in the following manner.

While the exact states of combination of vanadium and titanium in gray titanium dioxide pigments are unknown, we believe that at elevated temperatures, such as are those used for calcination, the change in tint produced by employing a carbon monoxide comprising atmosphere is due principally to a change in valence and, consequently, a change in color of the color imparting metal compounds of vanadium. It is well-known that $V_2O_5$ and many vanadium compounds in which the vanadium is present as $V^{+5}$ are yellow to brown in color, while $V_2O_4$ and many compounds in which the vanadium is present as $V^{+4}$ are dark blue. The chemical reactions involved by a carbon monoxide comprising atmosphere may be expressed in terms of the oxide by the equation:

(1) 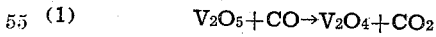  $V_2O_5 + CO \rightarrow V_2O_4 + CO_2$

The reaction involved on exposing the pigment calcined in a carbon monoxide comprising atmosphere to oxidizing conditions while at a temperature above about 400° C. may be expressed by the equation:

(2) 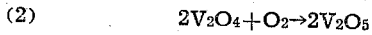  $2V_2O_4 + O_2 \rightarrow 2V_2O_5$

Thus, in terms of the oxides, calcining in a carbon monoxide comprising atmosphere would favor the first reaction and thus impart a blue tint to the pigment. The maximum blue possible in a given pigment mixture would be obtained if all of the vanadium were converted to $V_2O_4$ and the materials were quickly cooled to below about 400° C. in a neutral or carbon monoxide free atmosphere in order to prevent the second reaction from taking place. The desired degree of blue or yellow tint, within certain limits determined by the ratio of vanadium to $TiO_2$, is obtained by controlling reaction (2). If reaction (2) is permitted to go to completion by holding the pigment above about 400° C. for a sufficiently long period of time in a carbon monoxide free and oxygen comprising atmosphere, a gray pigment with a yellow subordinate tint would be obtained. However, reaction (2) can be controlled to any desired degree of completion by rapid cooling to about 400° C., below which temperature the rate of reaction becomes so slow that for all practical purposes no further change in tint is observed. Hence, calcining in a carbon monoxide comprising atmosphere and carefully controlling the time the pigment at a temperature in excess of about 400° C. is exposed to a carbon monoxide free and oxygen comprising atmosphere, produces the desired subordinate tint in the final pigment. It should be pointed out that the carbon monoxide comprising atmosphere, hereinbefore described need not be free from oxygen, i. e. it need not be what is ordinarily termed a reducing atmosphere. Even though it contains substantial amounts of oxygen, the unexpected results described herein are obtained providing it comprises not less than about 0.05% carbon monoxide.

It is to be understood that we are merely offering the above theory as an explanation of the results which are obtained when our novel process is employed for the manufacture of gray titanium dioxide pigments, and are not in any way limited thereto.

Our process possesses advantages not previously combined in a single pigment manufacturing process. Furthermore, the pigment products of our novel process possess advantages not previously combined in pigment materials. For example, our novel process permits the manufacture of gray titanium dioxide pigments of predetermined desirable blue tints or undertones. Furthermore, modification of our process as hereinbefore described permits the manufacture of gray titanium dioxide pigments having predetermined subordinate tints other than blue, namely, neutral and yellow. Moreover, our novel process, when practiced as hereinbefore described to produce pigments having a blue undertone, produces pigments which are much darker grays than those produced by prior art processes, such as that of U. S. Patent 2,062,137, i. e., produces pigments of definitely lower value as defined by the Munsell color scale. Furthermore, the gray titanium dioxide pigment products of our novel process have proven themselves to be definitely superior to prior art mixtures of a white pigment and a colored pigment, such as carbon black, and the like, formerly employed in gray paints, and, more particularly, the blue-gray and neutral gray products of our process are also superior to the gray titanium dioxide pigment products of U. S. Patent 2,062,137. For instance, the employment of said gray titanium dioxide pigments in outside paints, such as oil type paints, orthodox and alkyd resin enamels, pyroxylin lacquers, and the like, applied to wood, metal, etc., exposed to the elements, results in films which chalk definitely less than do those comprising the aforementioned prior art pigment mixtures. In addition, when the hereinbefore described novel gray titanium dioxide pigment comprising films do chalk on excessive exposure, the chalk is colored and the objectionable whitening effects, noted when paints containing mixtures of white and colored pigments are employed, are not evident. Moreover, in view of the fact that in the paint, rubber, linoleum, paper, textile and related industries, blue-gray tints are associated with quality, the novel blue-gray pigment products of our invention fill a real need in said industries. Said blue-gray pigment products permit the manufacture of coating compositions, such as gray outside house paints, and the like, and the manufacture of gray pigment impregnated materials, such as gray rubber, for example, having the blue subordinate tints desired in said industries.

As many apparently widely different embodiments of this invention may be made without departing from the spirit and scope thereof, it is to be understood that we do not limit ourselves to the specific embodiments except as defined in the appended claims.

Having described the present invention the following is claimed as new and useful.

1. A process for controlling the subordinate tint of gray titanium pigments which comprises calcining to a temperature of not less than about 800° C. an intimate mixture comprising a titanium pigment, a vanadium compound, and an alkali metal salt, said calcination being conducted for at least the final portion of the calcination period in an atmosphere comprising carbon monoxide and oxygen, and thereafter cooling the pigment in an oxygen comprising atmosphere substantially free from carbon monoxide to a temperature below about 600° C., effecting said cooling within a period of between about two seconds and about five minutes to obtain a pigment having a bluish tint, effecting said cooling within a period of between about five minutes and about one hour to obtain a pigment having a neutral tint, and effecting said cooling within a period of between about one hour and about five hours to obtain a pigment having a yellowish tint.

2. A process for controlling the subordinate tint of gray titanium pigments which comprises calcining at a temperature between about 800° C. and about 1050° C. an intimate mixture comprising a titanium pigment, between about 0.05% and about 5%, calculated as elemental vanadium and based upon the weight of the titanium pigment, of a vanadium compound, and between about 0.3% and about 3%, calculated as alkali metal and based upon the weight of the titanium pigment, of an alkali metal salt, said calcination being conducted for at least the final portion of the calcination period in an atmosphere comprising oxygen and from about 0.05% to about 15% carbon monoxide, and thereafter cooling the pigment in air to a temperature below about 600° C., effecting said cooling within a period of between about two seconds and about five minutes to obtain a pigment having a bluish tint, effecting said cooling within a period of between about five minutes and about one hour to obtain a pigment having a neutral tint, and effecting said cooling within a period of between about one hour and about five hours to obtain a pigment having a yellowish tint.

3. A process for controlling the subordinate tint of gray titanium pigments which comprises calcining at a temperature between about 800° C. and about 1050° C. for a period of time between about 15 minutes and about 5 hours an intimate mixture comprising a titanium pigment, between about 0.1% and about 2%, calculated as elemental vanadium and based upon the weight of the titanium pigment, of a vanadium salt, and between about 0.3% and about 3%, calculated as potassium and based upon the weight of the titanium pigment, of a potassium salt, said calcination being conducted for at least the latter part of the calcination period in an atmosphere comprising oxygen and from about 0.1% to about 2% carbon monoxide, and thereafter cooling the pigment in air to a temperature below about 600° C., effecting said cooling within a period of between about two seconds and about five minutes to obtain a pigment having a bluish tint, effecting said cooling within a period of between about five minutes and about one hour to obtain a pigment having a neutral tint, and effecting said cooling within a period of between about one hour and about 5 hours to obtain a pigment having a yellowish tint.

4. A process for controlling the subordinate tint of gray titanium pigments which comprises calcining at a temperature between about 850° C. and about 1050° C. for a period of time between about 15 minutes and about 5 hours, an intimate mixture of a titanium pigment, between about 0.2% and about 1% calculated as elemental vanadium and based upon the weight of the titanium pigment, of vanadyl chloride, and between about 0.3% and about 3%, calculated as potassium and based upon the weight of the titanium pigment, of potassium carbonate, said calcination being conducted for at least the latter part of the calcination period in an atmosphere comprising oxygen and from about 0.1% to about 2% carbon monoxide, and thereafter cooling the pigment in air to a temperature below about 400° C., effecting said cooling within a period of between about two seconds and about five minutes to obtain a pigment having a bluish tint, effecting said cooling within a period of between about five minutes and about one hour to obtain a pigment having a neutral tint, and effecting said cooling within a period of between about one hour and about five hours to obtain a pigment having a yellowish tint.

5. A process for producing a neutral gray titanium pigment which comprises calcining at a temperature between about 850° C. and about 1050° C. for a period of time between about 15 minutes and about 5 hours, an intimate mixture of a titanium pigment, between about 0.2% and about 1% calculated as elemental vanadium and based upon the weight of the titanium pigment, of vanadyl chloride, and between about 0.3% and about 3%, calculated as potassium and based upon the weight of the titanium pigment, of potassium carbonate, said calcination being conducted for at least the latter part of the calcination period in an atmosphere comprising oxygen and from about 0.1% to about 2% carbon monoxide, and thereafter cooling the pigment in an oxygen comprising atmosphere substantially free from carbon monoxide, said cooling being effected during an interval of time between about 5 minutes and about one hour.

6. A process for producing a gray titanium pigment having a blue undertone which comprises calcining at a temperature between about 850° C. and about 1050° C. for a period of time between about 15 minutes and about 5 hours, an intimate mixture of a titanium pigment, between about 0.2% and about 1% calculated as elemental vanadium and based upon the weight of the titanium pigment, of vanadyl chloride, and between about 0.3% and about 3%, calculated as potassium and based upon the weight of the titanium pigment, of potassium carbonate, said calcination being conducted for at least the latter part of the calcination period in an atmosphere comprising oxygen from about 0.1% to about 2% carbon monoxide, and thereafter cooling the pigment in an oxygen comprising atmosphere substantially free from carbon monoxide, said cooling being effected during an interval of time between about 2 seconds and about 5 minutes.

7. A process for producing a gray titanium pigment having a blue undertone which comprises calcining at a temperature between about 850° C. and about 1050° C. for a period of time between about 15 minutes and about 5 hours, an intimate mixture of a titanium pigment, between about 0.2% and about 1% calculated as elemental vanadium and based upon the weight of the titanium pigment, of vanadyl chloride, and between about 0.3% and about 3%, calculated as potassium and based upon the weight of the titanium pigment, of potassium carbonate, said calcination being conducted for at least the latter part of the calcination period in an atmosphere comprising oxygen and from about 0.1% to about 2% carbon monoxide, and thereafter cooling the pigment, said cooling being effected in an atmosphere comprising more than about 0.05% carbon monoxide, and being effected during a period between about two seconds and about five minutes.

8. A process for producing a gray titanium pigment having a yellowish tint which comprises calcining at a temperature between about 850° C. and about 1050° C. for a period of time between about 15 minutes and about 5 hours, an intimate mixture of a titanium pigment, between about 0.2% and about 1% calculated as elemental vanadium and based upon the weight of the titanium pigment, of vanadyl chloride, and between about 0.3% and about 3%, calculated as potassium and based upon the weight of the titanium pigment, of potassium carbonate, said calcination being conducted for at least the latter part of the calcination period in an atmosphere comprising oxygen and from about 0.1% to about 2% carbon monoxide, and thereafter cooling the pigment in an oxygen comprising atmosphere substantially free from carbon monoxide, said cooling being effected during an interval of time between about 1 hour and about 5 hours.

HOLGER H. SCHAUMANN.
ROBERT K. WHITTEN.
ROBERT W. BALL.

CERTIFICATE OF CORRECTION.

Patent No. 2,231,455. February 11, 1941.

HOLGER H. SCHAUMANN, ET AL.

It is hereby certified that error appears in the printed specification of the above numbered patent requiring correction as follows: Page 2, second column, line 23, for "dischargd" read --discharged--; page 5, first column, line 66, after the word "blue" insert --tint--; page 6, second column, line 75, claim 6, after "oxygen" insert --and--; and that the said Letters Patent should be read with this correction therein that the same may conform to the record of the case in the Patent Office.

Signed and sealed this 25th day of March, A. D. 1941.

(Seal)

Henry Van Arsdale,
Acting Commissioner of Patents.